United States Patent [19]

Herbstzuber

[11] Patent Number: 5,046,648
[45] Date of Patent: Sep. 10, 1991

[54] HYGIENIC DISPENSER

[76] Inventor: Remedios E. Herbstzuber, 8643 Miramar Pkwy., Miramar, Fla. 33025

[21] Appl. No.: 460,038

[22] Filed: Jan. 2, 1990

[51] Int. Cl.⁵ .............................................. B67D 3/00
[52] U.S. Cl. ..................................... 222/638; 222/82; 222/103; 222/105; 222/156; 222/181; 222/341; 222/372; 92/22
[58] Field of Search ...................... 222/82, 83, 5, 103, 222/156, 157, 181, 183, 185, 256, 263, 105, 309, 340, 341, 372, 638, 644, 477; 417/549; 92/15, 16, 19, 22, 29; 221/16

[56] References Cited

U.S. PATENT DOCUMENTS

| 1,731,545 | 10/1929 | Sanders | 222/156 |
| 2,751,128 | 3/1953 | Prince | 222/447 |
| 2,841,311 | 7/1958 | Parizek | 222/181 |
| 2,966,278 | 12/1960 | Drury | 222/644 |
| 3,129,845 | 4/1964 | Musser | 222/41 |
| 3,384,080 | 5/1968 | Muller | 128/214 |
| 3,587,934 | 6/1971 | Elmore | 222/181 |
| 3,625,398 | 9/1969 | Tometsko | 222/638 |
| 4,228,925 | 10/1980 | Mendelovich | 222/103 |
| 4,324,348 | 4/1982 | Johnson et al. | 222/181 |
| 4,437,585 | 3/1984 | Banks | 222/181 |
| 4,474,307 | 10/1984 | Chappell | 222/1 |
| 4,502,617 | 3/1985 | Stecker et al. | 222/341 |

Primary Examiner—Kevin P. Shaver
Assistant Examiner—Philippe Derakshanai
Attorney, Agent, or Firm—Oltman and Flynn

[57] ABSTRACT

A dispenser for liquid germicide includes a container for germicide and an outlet, a metering device for metering a given amount of germicide to be dispensed from the outlet, a spout communicating with the metering device for dispensing metered germicide, and a timing arrangement coupled to the metering device for timed control of the frequency of dispensing the metered amount of germicide.

10 Claims, 3 Drawing Sheets

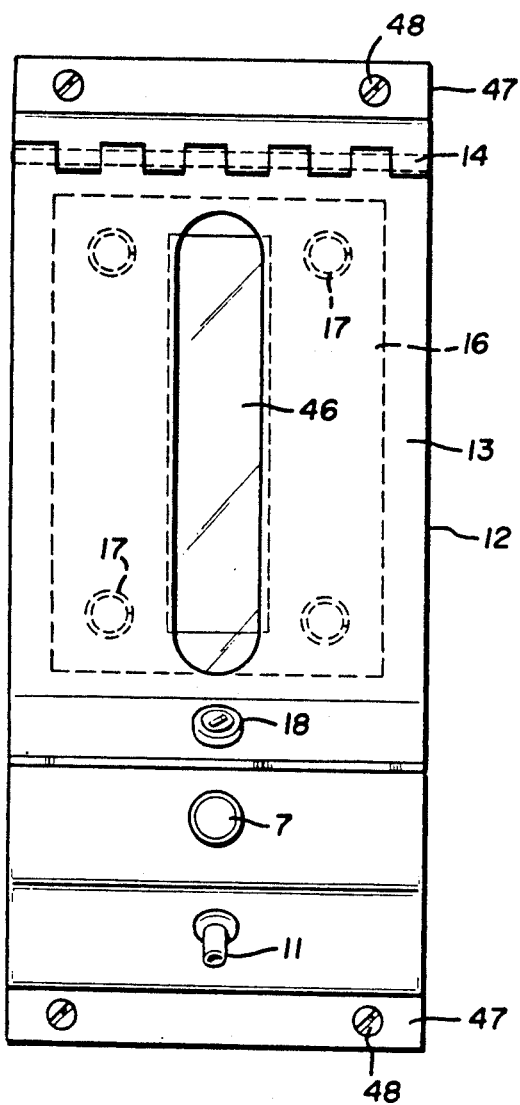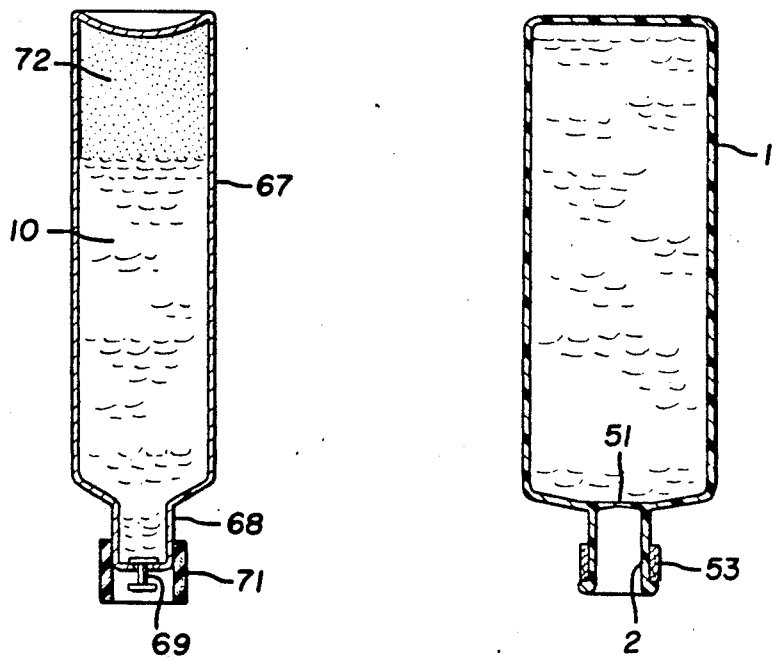

HYGIENIC DISPENSER

The invention relates to a hygienic dispenser for dispensing liquid germicide, especially for deployment in public rest rooms and the like.

BACKGROUND AND PRIOR ART

It is well known that public restrooms are often times not maintained to satisfactory standard of cleanliness, and users are therefore often reluctant to make use of such facilities.

Dispensers for soaps, detergents and paper towels are well known for use in public rest rooms. U.S. Pat. Nos. 2,841,311 and 4,324,348 show liquid dispensers for soap and the like. U.S. Pat. No. 4,437,585 shows a dispenser for metering the liquid being dispensed at each activation of the dispensing mechanism, in order to avid unnecessary waste of the dispensed liquid.

None of the known dispensers, however, quite meet the need for a satisfactory dispenser of cleansing liquids which are needed in order to attain satisfactory protection against spreading of infectious germs from communicable diseases, in public restrooms.

It is therefore the object of the instant invention to provide an improved dispenser for dispensing germicidal liquids that overcomes the drawbacks of the know dispensers.

SUMMARY OF THE INVENTION

There is accordingly provided a dispenser for liquid germicide, having a container for germicide and an outlet, a metering device for metering a given amount of germicide to be dispensed, fluidly communicating with the outlet, a spout in fluid communication with the metering device for dispensing metered germicide, and a timing arrangement coupled to the metering device for timed control of the frequency of dispensing the metered amount of germicide. There is further provided that the dispenser may include a housing for enclosing the container, the metering device and the timing arrangement.

According to a further feature, there is provided a dispenser according to the invention, wherein the container is flexibly yieldable and includes a spring-biased baffle disposed internally of the housing, in engagement with the container for exerting a given pressure on said liquid germicide. The container, according to the invention may alternatively be a rigid cannister, which includes a pressure agent enclosed in the cannister for exerting pressure on the liquid germicide in the cannister. There may further be provided a dispenser according to the invention which includes a foaming agent disposed in the cannister for foaming said germicide as it is expelled through the spout.

According to a still further feature, the metering device includes an inlet for fluid-tight engagement with the outlet of the germicide container and a spout for ejecting the germicide.

There may further be provided a dispenser according to the invention which includes a sprayer or atomizer coupled to the spout for atomizing the germicide expelled from the spout. The timing arrangement may include a clock-work in engagement with the metering device for the dispensing of the given amount of germicide until the lapse of a given time, as determined by the clock-work, or the timing arrangement may include a timing cylinder containing a viscous liquid, a timing piston axially movable in the cylinder, and friction elements for allowing the piston to move slowly in one direction and fast in opposite direction, and an escapement linkage coupling the timing piston to the metering arrangement for time repeated release of the germicide. In accordance with the invention, the metering arrangement includes a metering cylinder, a metering piston, an intake valve in the metering cylinder which is fluidly communicating with the outlet of the germicide container, and an outlet valve fluidly communicating with the spout, and wherein there is provided a seal in the outlet, a metering inlet attached to the metering arrangement for fluidly communicating with the aforesaid outlet, and a piercing device disposed in the metering inlet for piercing the seal upon attachment of the container to the metering inlet.

The invention also includes compositions for liquid germicides, which may include elements such as denatured alcohol, disinfectants such as phenol, hexaclorophene and the like, essences of fragrance, surfactants such as sulfonated oil or the like, and dyes.

Further objects and advantages of this invention will be apparent from the following detailed description of a presently preferred embodiment which is illustrated schematically in the accompanying drawings.

BRIEF DESCRIPTION OF THE DRAWING

FIG. 3 is an elevational front view of the invention.

FIG. 4 is an elevational diagrammatic cross-sectional view showing the germicide container;

FIG. 6 is an elevational diagrammatic cross-sectional view of the invention showing the germicide container as a rigid cannister.

DESCRIPTION OF THE PREFERRED EMBODIMENTS

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
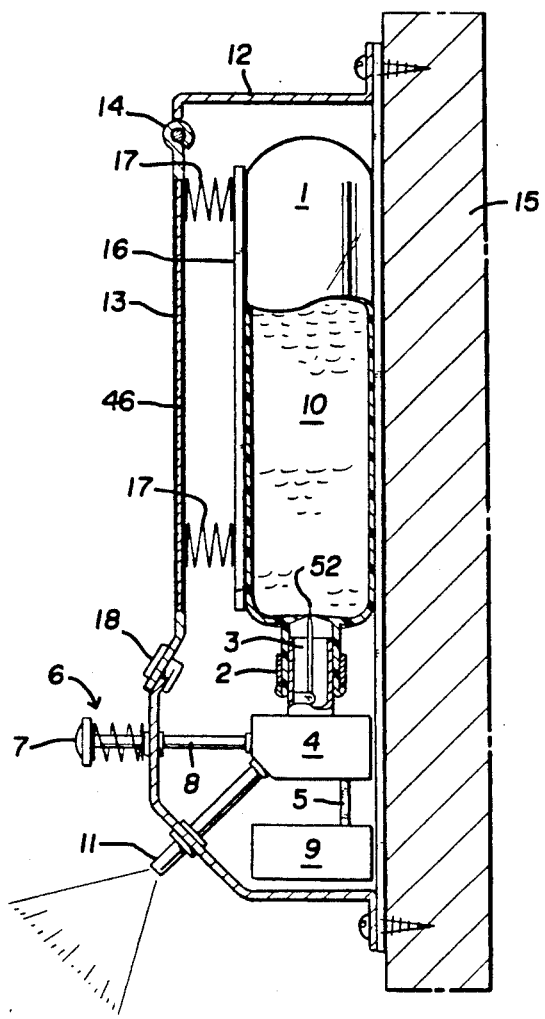
FIG. 1 is an elevational diagrammatic cross-section side view of the invention with part of the wall broken away to show the interior construction.

FIG. 1, a germicide dispenser is shown in a side view, attached to a wall 15. A container 1 contains a suitable germicide or disinfectant in liquid form. The container 1 is advantageously a flexible bag of a translucent or transparent material. The bag has an outlet 2 connected to an inlet 3 of a metering device 4, which has an activating handle 6, advantageously in the form of a push button or plate 7 attached to a shaft 8 engaging the metering device 4. The activating handle may optionally be a hinged lever, or an electric solenoid, activatable by suitable switching means.

The metering device 4 is connected via a timing linkage 5 with a timing arrangement 9 which operates to prevent reactivation of the metering device 4 until passing of a certain lapse of time after each activation in order to avoid undesirable depletion or waste of the germicide.

The metering device 4 has a spout 11 that ejects the germicide, from where it can be collected on a piece of tissue paper for rinsing and disinfecting hands and other body parts as desired after use of the restroom facilities.

The elements of the dispenser are enclosed in a housing 12, having a hinged front door 13 with hinge 14, and a spring mounted baffle 16, with e.g. coil springs 17, mounted facing inward on the door 13, for applying a moderate amount of pressure on the fluid container 1 when the door 13 is closed. A key lock 18 serves to lock the door 13.

Figure 2:
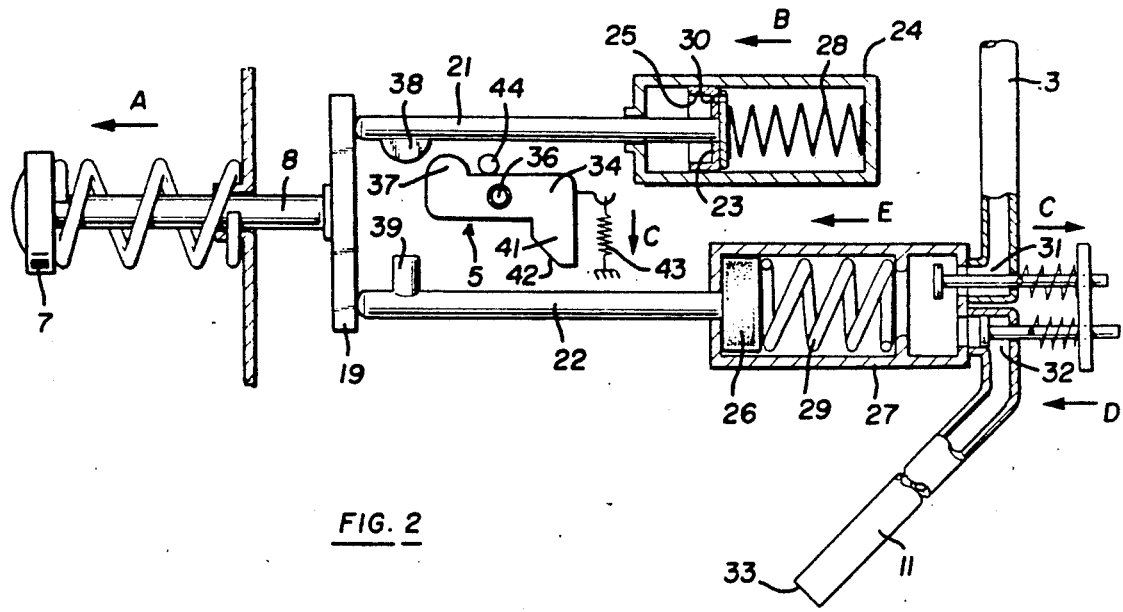
FIG. 2 is a diagrammatic cross-sectional detail view of the invention showing metering and timing elements.

FIG. 2 shows details of the metering and timing devices. When the handle 7 is pushed inward, the shaft 8 with a cross piece 19 drives inward two push rods, the timing push rod 21 and the metering push rod 22, respectively connected to a timing piston 23 slidably disposed in a timing cylinder 24 and a metering piston 26, slidably disposed in a metering cylinder 27. Each cylinder contains a respective timing bias spring 28 and metering bias spring 29, which operate to urge each piston back to its rest position at the left hand side of the cylinder as indicated by arrows B and E. The timing piston 23 has a circular upturned soft collar 25, which allows the timing piston to move relatively unimpeded toward the right hand side, but closes tightly against the inner walls of the timing cylinder 24 when the piston 23 moves toward the left hand side. A small orifice 30 is formed through the timing cylinder 24 to flow through the viscous fluid in the timing cylinder 24 to flow through the orifice 30 at a given rate which determines the travel time of the piston 23 as it moves from the right hand side to the left hand side of the timing cylinder 24.

The metering cylinder 27 has an inlet 3 connected to a one-way inlet valve 31, which enables the metering piston to draw in germicide from the container 1 on its outward stroke. Upon operation of the handle 7, germicide in the metering cylinder 27 is driven out through a one-way outlet valve 32 and the spout 11.

The spout 11 may advantageously have a spray head 33 of conventional construction, which disperses the liquid germicide as a mist or spray as it is driven out of the spout 11.

A linkage 5 in the form of a toggle 34 links the timing arrangement to the metering device so as to prevent rapid reoperation of the metering piston 26. The toggle pivots about a pivot point 36, and has a toggle cam 37, engaging a timing cam 38 on the timing push rod 21 when the handle 7 is driven inward, causing the toggle 34 to simply pivot to admit the cam 38. As the pistons 23, 26 are driven inward, a metering cam 39 on the metering rod 22 passes a detent 41 on the inner end of the toggle 34, which has a sloping edge 42 that admits the metering cam 39. A toggle spring 43 operates to restore the toggle 34 to its normal position against a stop 44. After the metering cam 39 has passed the detent 42, the metering piston 26 is temporarily detained in its right hand position by the detent 41, while the metering piston 23 starts its timed slow move toward the left hand side driven by timing spring 28. As the metering piston approaches its outer left hand position, the timing cam 38 again engages the toggle cam 37, causing the toggle 34 to pivot again, and allows the metering cam 39 to escape from the detent 41, causing the metering piston 26 to move leftward, driven by metering spring 29.

It is to be understood that the cross member 19 is offset in direction perpendicular to the plane of the drawing so as not to interfere with the toggle 34.

FIG. 3 is a front view of the germicide dispenser, showing the front door 13, hingedly attached to the housing 12 by hinge 14, and secured in its closed position by a key lock 18. A transparent window 46 in the door 13 allows a view of the liquid level of the container 1 to indicate need to replacement, when the liquid is exhausted. The handle 7 is seen above the spout 11.

Two metering flanges 47 allow the dispenser 13 to be attached to a wall by fasteners such as screws 48.

FIG. 4 is an elevation of the flexible container 1, showing in cross-section the outlet 2, having a seal 51, serving to contain the liquid contents of the container 1. Upon installing the container, as seen in FIG. 1, the outlet 2 is pressed down over the inlet 3, with a perforating needle 52 piercing the seal 51. The outlet 2 is advantageously equipped with a circular elastic tension ring 53 which serves to reinforce the sealing grip of the outlet 2 against the inlet 3.

Figure 5:
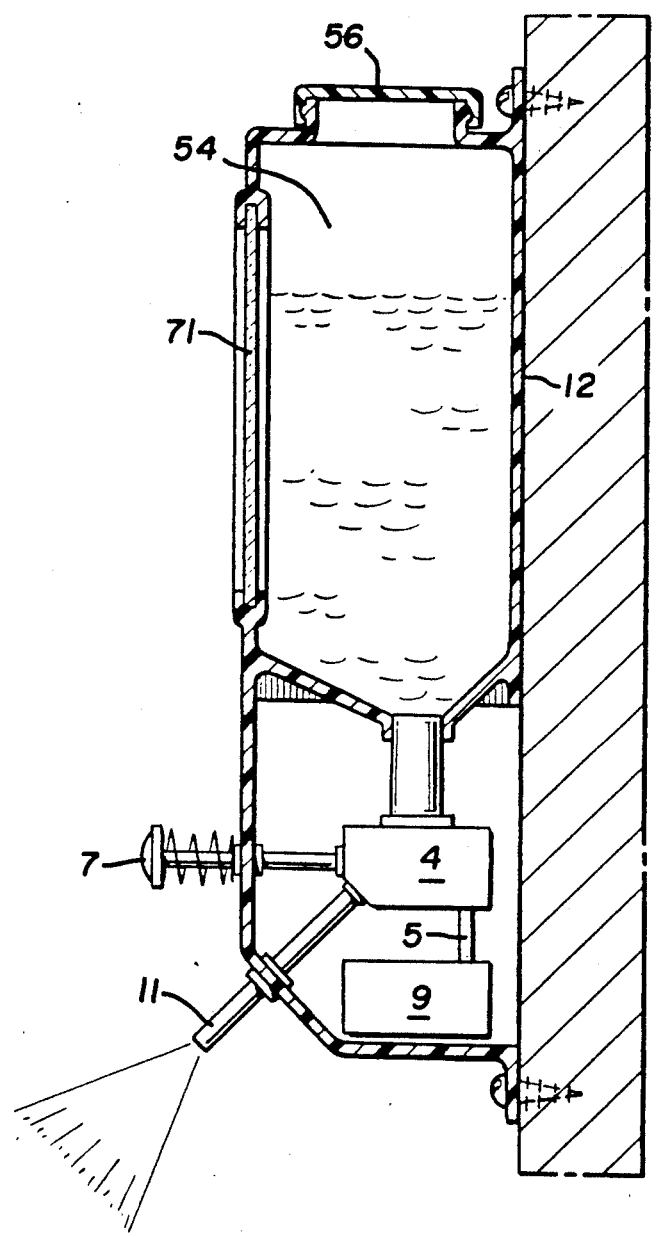
FIG. 5 is an elevational diagrammatic cross-sectional view of the invention showing the housing used as a germicide container.

FIG. 5 shows an embodiment of the invention, wherein no plastic container is used, but wherein a cavity 54 is provided directly in the housing 12, allowing the germicide liquid to be poured into the housing. A lid 56 is provided on top of the housing for poring germicide into the cavity 54. A transparent front window 71 may be provided to show the level of germicide in the cavity 54.

In still another embodiment seen in FIG. 6, the container 1 may be constructed as a rigid cannister 67 having a conventional valve 69 that is opened by contact with the inlet 3, and a rubber seal 71, fitting the upper part of the inlet 3. The cannister 67 is partially filled with liquid germicide 10 and includes a propellant 72 in the form of a compressed gas as known from aerosol cans and the like.

The liquid germicide may contain a suitable foaming agent such as sulfonated oil or the like, such that a germicide in the form of foam is dispensed from the spout 11.

The germicide liquid dispensed from the dispenser may contain anyone of a number of well known germicides, such as hexaclorophene, carbolic acid, biphenols and others, combined with a wetting agent such as sulfonated oil, aromatic compounds such as essential oils, suspended in etayl alcohol or isopropyl alcohol. A dye may be added to show the level of germicide in the container 1.

A typical germicide may include hexaclorophene in the amount of 1-2 percent, sulfonated oil in the amount of 5-10 percent, and the remainder consisting of isopropyl alcohol, essential oils and a dye.

I claim:
1. A dispenser for liquid germicide, comprising a container for germicide having an outlet, a metering device for metering a given amount of germicide to be dispensed fluidly communicating with said outlet, a spout fluidly communicating with said metering device for dispensing metered germicide, and timing means coupled to said metering device for timingly controlling the frequency of dispensing said metered amount of germicide;

said timing means including a delay device in engagement with said dispenser for inhibiting the dispensing of said given amount of germicide until elapse of a given time determined by said delay device;

said delay device including a timing cylinder containing a viscous liquid, a timing piston axially movable in said cylinder, and friction means for allowing said piston to move slowly in one direction and fast in the opposite direction, and release linkage coupling said timing piston to said metering means for timed releasing of said metering means.

2. Dispenser according to claim 1 wherein said metering device include a metering cylinder, a metering piston slidably disposed in said metering cylinder, an intake valve in said metering cylinder fluidly communicating with said outlet, and an outlet valve fluidly communicating with said spout.

3. A dispenser according to claim 1, wherein said metering device includes an inlet for fluid-tight engagement with said outlet and a spout for ejecting said germicide.

4. Dispenser according to claim 3, including an atomizer coupled to said spout for atomizing said germicide at said spout.

5. A dispenser according to claim 1, including a housing for enclosing said container, said metering device and said timing means.

6. A dispenser according to claim 5, wherein said container is a rigid cannister, including a pressure agent disposed in said cannister for exerting pressure on said liquid germicide.

7. A dispenser according to claim 5, including a window in said housing for view the germicide level in said container.

8. A dispenser according to claim 5, wherein said container is flexibly yieldable, and including a spring-biased baffle disposed internally of said housing, in engagement with said container for exerting a given pressure on said liquid germicide.

9. A dispenser according to claim 8, including a foaming agent disposed in said container for foaming said germicide as it is expelled through said spout.

10. Dispenser according to claim 8 including a seal in said container outlet, a metering inlet attached to said metering device for fluidly communicating with said outlet, and piercing means disposed in said metering inlet for piercing said seal upon attachment of said container to said metering inlet.

* * * * *